(12) United States Patent
Lenoir et al.

(10) Patent No.: US 9,356,651 B2
(45) Date of Patent: May 31, 2016

(54) METHOD FOR SELF-ADAPTIVELY DEMODULATING QUASI-ORTHOGONAL SIGNALS, DEMODULATION UNIT AND RADIO SIGNAL RECEIVER

(71) Applicant: Commissariat A L'Energie Atomique et aux Energies Alternatives, Paris (FR)

(72) Inventors: Vincent Lenoir, Grenoble (FR); Didier Lattard, Rencurel (FR); Warody Lombardi, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 14/725,363

(22) Filed: May 29, 2015

(65) Prior Publication Data
US 2015/0372713 A1   Dec. 24, 2015

(30) Foreign Application Priority Data

Jun. 20, 2014   (FR) ...................................... 14 55719

(51) Int. Cl.
| | |
|---|---|
| *H04B 1/00* | (2006.01) |
| *H04B 1/709* | (2011.01) |
| *H04B 1/7075* | (2011.01) |
| *H04L 27/22* | (2006.01) |
| *H04L 27/26* | (2006.01) |

(52) U.S. Cl.
CPC ............ *H04B 1/709* (2013.01); *H04B 1/70752* (2013.01); *H04L 27/22* (2013.01); *H04L 27/2601* (2013.01); *H04B 2201/70713* (2013.01)

(58) Field of Classification Search
CPC ..... H04L 1/0065; H04L 1/006; H04L 1/0071; H04B 1/0475

USPC .......................................... 375/140, 147, 150
See application file for complete search history.

(56) References Cited

U.S. PATENT DOCUMENTS

| | | | |
|---|---|---|---|
| 2005/0135489 A1* | 6/2005 | Ho | H04L 5/20 375/257 |
| 2007/0014335 A1 | 1/2007 | Callaway et al. | |
| 2013/0016010 A1* | 1/2013 | Nayyar | G01S 19/30 342/357.69 |

FOREIGN PATENT DOCUMENTS

EP   1 107 469 A1   6/2001

OTHER PUBLICATIONS

French Preliminary Search Report issued Feb. 16, 2015 in French Application 14 55719, filed on Jun. 20, 2014 (with English Translation of Categories of Cited Documents).

*Primary Examiner* — David S Huang
(74) *Attorney, Agent, or Firm* — Oblon, McClelland, Maier & Neustadt, L.L.P.

(57) ABSTRACT

A method for decoding a data symbol carried by a signal received by a receiver of a communication system, the data symbol being modulated by a spread code sequence selected from a plurality of spread code sequences being quasi-orthogonal to each other to differentiate the symbol from other data symbols, and being received as a set of modulation bits, the method including a step of correlating the modulated data symbol received with each of the plurality of spread code sequences, and the correlating step is preceded by a step of sub-sampling the modulated data symbol received to mask one or more of the modulation bits therein, such that the step of correlating the sub-sampled data symbol received is carried out only for the non-masked modulation bits. It extends to a demodulation unit configured for the implementation of this method, and to a receiver integrating such a unit.

11 Claims, 5 Drawing Sheets

US 9,356,651 B2

METHOD FOR SELF-ADAPTIVELY DEMODULATING QUASI-ORTHOGONAL SIGNALS, DEMODULATION UNIT AND RADIO SIGNAL RECEIVER

TECHNICAL FIELD

The field of the invention is that of radio communications, and more particularly that of the demodulation of radio signals modulated according to the direct sequence spread spectrum technique.

STATE OF PRIOR ART

IEEE 802.15.4 standard, which defines in particular the physical layer of the low consumption protocol ZigBee intended to be used in the ISM ("Industrial, Scientific, and Medical") band at 2 450 MHz, is based on the direct sequence spread spectrum to transmit data, which is coupled with an O-QPSK ("Offset Quadrature Phase Shift Keying") type phase digital modulation.

The information to be transmitted is initially in the form of a stream of binary data (bits). These bits are grouped together by 4 which induces 16 possible combinations, that is 16 data symbols. Each of these symbols is then spread onto 32 "chips" (modulation bits) by a spectrum spreading sequence of its own and enables the symbol thus modulated to be differentiated from the other data symbols because of the quasi-orthogonality of the sequences with respect to each other.

These modulated symbols are transmitted to the radio transmitter after an O-QPSK modulation, the even modulation bits being on the in-phase I channel and the odd modulation bits on the quadrature Q channel of the modulator.

By construction, the spread code sequences are considered as nearly orthogonal to each other, namely the correlation of two different sequences is quasi-null whereas that of two identical sequences is high (equal to the sum of the product of the modulated bits). This property thus enables spread code sequences and thus symbols associated therewith to be readily discerned. Further, IEEE 802.15.4 standard optimizes the construction of the sequences to make their generation and storage simple. Indeed, the first 8 sequences from the 16 existing ones are constructed by rotating 4 modulation bits of the previous sequence. The last 8 sequences are constructed by inverting the odd modulation bits from the first 8 ones. Therefore, there is some coherence between all the spreading sequences as defined by the standard.

The demodulation of the radio signal received is based on the non-coherent detection of the spectrum spreading sequences, that is without knowing the signal phase, making the processing less complex. First, the signal is synchronized in time and in frequency. The time synchronization enables the detection window to be aligned on the modulated symbols received and to know the optimum position of the samples on the signal. For this, a sliding correlation during a preamble containing 8 times the sequence 0 enables the perfect alignment to be detected via the correlation peaks. From this information, the receiver then will sample the signal received at the rate of 1 sample per modulation bit, that is 32 samples per modulated symbol received. The second synchronization step is the estimation and correction of the frequency deviation between the transmitter and the receiver.

Once the synchronization is achieved, the decoding of a symbol consists in correlating each sampled received modulated symbol by the 16 existing sequences, equivalent to 16*32 correlations at the modulation bit level. The measurement of the correlation maximum (which modulus is squared to disregard the phase of the complex modulated signal) then enables the modulation sequence modulating the received modulated signal to be known as well as which symbol has been received. The information is then brought back into the binary form as it was upon transmitting.

Conventionally, a radio receiver is designed to operate under the worst transmission conditions defined by the standard (noise, attenuation related to the propagation losses, scramblers). But, this situation is only rarely reached since it represents an extreme case. Consequently, the operation of the receiver is not optimum most of the time since there is extra calculation and consumption regarding the performances imposed by the standard. Concretely, in the case of the demodulation of IEEE 802.15.4 signals, this problem can be observed on the correlation levels achieved. Indeed, the errorless detection is determined by the distance separating the two correlation maxima from the 16 values obtained by testing each sequence.

If a risk factor such as a very loud noise in comparison with the orthogonality between the sequences appears, a detection error can occur. It is thus necessary to ensure some orthogonality degree of the sequences such that in the worst situation, the distance between both maxima is sufficient to properly discern the sequences. However, if this operating margin ensures an errorless demodulation, it is over-evaluated most of the time because of the variability of the signal quality which is not always very poor.

In FIG. 1, represented are the correlation peaks observed for each of the 16 spread code sequences S0-S15. The correlation maximum is observed for the sequence S2, and the second peak, immediately lower than the correlation maximum, is observed for the sequence S14. For each of the peaks, a black zone represents the variation in the correlation level as a function of noise. The operating margin Mf corresponds to the distance between both maxima. It ensures a discrimination immune to risk factors of both peaks, within an error rate.

From the preceding, it is understood that the performance/consumption operating point of the demodulation is fixed to ensure a proper operation in the worst case, which generates extra calculation and consumption with respect to the required performances and actual conditions (quality of the signal received).

To reduce consumption, it has been proposed by US 2007/0014335 A1 to perform a sub-sampling of the received signal before demodulation. Correlating a data symbol with a spreading sequence is then a partial correlation performed for only certain modulation bits of the data symbol, for example only for the first M modulation bits. The number M of bits selected for the partial correlation can be changed depending on the received signal quality, for example by increasing the number M until the maximum correlation value exceeds a threshold.

DISCLOSURE OF THE INVENTION

The invention aims at providing a technique enabling the performance/consumption operating point of the demodulation to be adapted to minimize calculations and thus consumption while ensuring the same performances overall in terms of error rate as the previously mentioned optimum solution.

To that end, the invention provides a method for decoding a data symbol carried by a signal received by a receiver of a communication system, the data symbol being modulated by a spread code sequence selected from a plurality of spread code sequences being quasi-orthogonal to each other to differentiate the symbol from other data symbols, and which is received as a set of modulation bits, the method comprising:

a step of correlating the modulated data symbol received with each of the plurality of spread code sequences;

before the step of correlating, a step of sub-sampling the modulated data symbol received to mask one or more of the modulation bits therein, such that the step of correlating the sub-sampled data symbol received is carried out only for the non-masked modulation bits;

wherein the method further comprises the step of calculating the deviation between the two greatest correlation values obtained at the end of the step of correlating, and of modifying or not, depending on said deviation or on a value calculated from said deviation, the number of modulation bits masked during the step of sub-sampling.

Using the deviation between the two largest correlation values to decide whether to change the number of masked modulation bits allows to be sensitive to different parameters that can influence the difference between the two maxima. This sensitivity ensures good performance in terms of error rates, while minimizing consumption.

Some preferred but not limiting aspects of the method are the following ones:

it further comprises, subsequent to the correlating step, the steps of:
  searching for the correlation maximum to identify which one of the plurality of spread code sequences modulates the modulated data symbol received; and
  decoding the modulated data symbol received from the spread code sequence identified;
modifying the number of masked bits during the sub-sampling step comprises selecting a sub-sampling mask from a plurality of sub-sampling masks.

The invention extends to a demodulation unit configured for the implementation of this method, as well as to a receiver integrating such a unit.

BRIEF DESCRIPTION OF THE DRAWINGS

Further aspects, purposes, advantages, and characteristics of the invention will become more apparent upon reading the following detailed description of preferred embodiments thereof, given by way of non-limiting example, and made in reference to the appended drawings in which.

DETAILED DISCLOSURE OF PARTICULAR EMBODIMENTS

Figure 1:
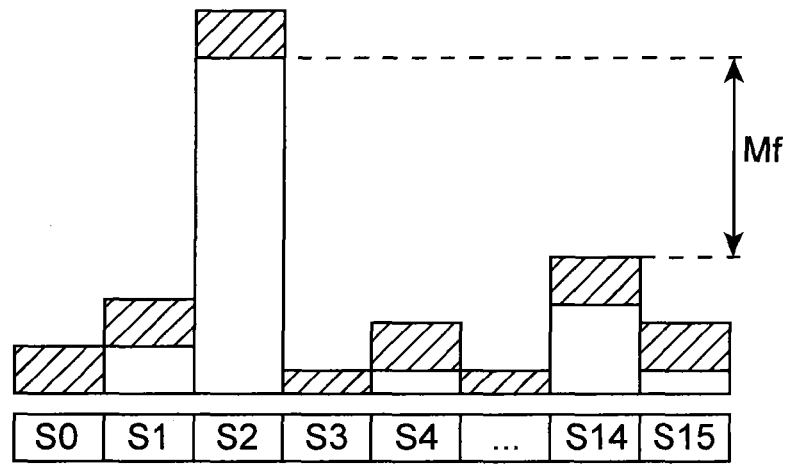
FIG. 1, already previously discussed, is a schematic example representing the correlation peaks observed for each of the 16 spread code sequences S0-S15 within the scope of a conventional operation.

The invention relates to a method for decoding a data symbol carried by a signal received by a receiver of a communication system. The invention also extends to a demodulation unit of a receiver for a communication system configured to enable this decoding method to be implemented.

Within the scope of the invention, the data symbol received by the receiver is modulated by a spread code sequence selected from a plurality of spread code sequences being quasi-orthogonal to each other to differentiate the symbol from other data symbols. It is received in the form of a set of modulation bits.

The invention is applicable in particular, but non-exclusively, to a direct sequence spread spectrum (DSSS), meeting IEE 802.15.4™-2011 standard. In particular, the invention is not limited to the O-QPSK modulation recommended by this standard, its principle remaining valid whatever the transmission type provided that an orthogonality between the spreading sequences enables them to be differentiated by correlation.

The following description is based on this standard. But, of course, the invention is not limited to this particular implementation. Thus, a transmitter side modulation which uses 16 different spread code sequences to differentiate 16 symbols each corresponding to 4 data bits is only taken by way of illustrating example. Each of these symbols is spread on 32 modulation bits by a spectrum spreading sequence of its own to form a modulated symbol which is then transmitted on the communication channel from the transmitter to the receiver.

On the receiver side, and within a demodulation unit, the modulated symbol received is subjected to a correlation operation with each of the 16 spread code sequences. In so far as a spread code sequence typically takes the form of a pseudo-random sequence of 1 and −1, the correlation operation providing a maximum enables the spread code sequence modulating the received coded symbol to be identified. Indeed, in so far as $1 \times 1 = 1$ and $-1 \times -1 = 1$, the sum of the multiplication of each of the modulation bits of the modulated symbol received with the corresponding modulation bits of a spread code sequence provides a maximum (equal to 32 before squaring) when this is the sequence modulating the symbol. Conversely, when two different sequences are correlated, the sum of the +1 and −1 is nearly compensated for.

Within the scope of the invention, the decoding method comprises a step, implemented before correlating the modulated data symbol received with each of the plurality of spread code sequences, of sub-sampling the modulated data symbol received to mask one or more of the modulation bits therein, such that the correlating step is carried out only for the non-masked modulation bits of the sub-sampled data symbol received.

The invention thus suggests to reduce, in the correlation of the received modulated symbols, the number of modulation bits taken into account. This reduction takes the form of a sub-sampling resulting finally to less than 1 sample per modulation bit. Therefore, it is possible to carry out a variable number of correlations at the modulation bit level to decode a symbol, ranging from 1 to 32.

The impact of this masking mechanism of some modulation bits to exclude them from the correlation operation is a decrease in the orthogonality between the spread code sequences, which inherently decreases the operating margin. Indeed, on the one hand the correlation maximum will be lower because of a shorter sequence (smaller signal norm) and on the other hand, the quasi-orthogonality of the sequences will be less sharp, making the correlation of two different sequences largely non-null. As a compensation for this degradation of the optimum operation, a reduced number of operations is made, which enables the consumption to be decreased. Besides, as will be detailed hereinafter, this degradation can be made while controlling the performance level so as to meet an imposed error rate.

Figure 2:
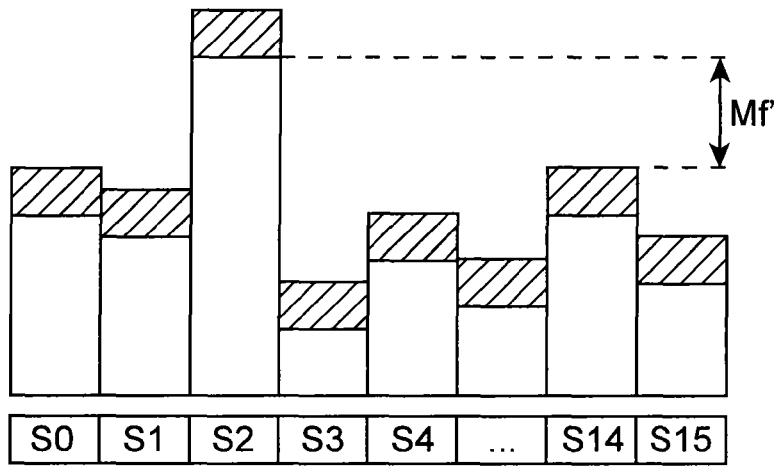
FIG. 2 is a schematic example representing the correlation peaks observed for each of the 16 spread code sequences S0-S15 within the scope of the degraded operation according to the invention.

Thereby, in FIG. 2 represented are the correlation peaks observed within the scope of the invention for each of the 16 spread code sequences S0-S15. The correlation maximum is observed for the sequence S2, and the second peak, immediately lower than the correlation maximum, is observed for the sequence S14. An operating margin Mf' is observed between both maxima, being reduced with respect to the margin Mf of FIG. 1.

To quantify the sub-sampling, a rate corresponding to the ratio of the number of actually used modulation bits to the total number of modulation bits in a sequence, that is 32 in the example considered herein, is defined. A sub-sampling at a 50% rate, for example, amounts to considering that only half of the modulation bits received is taken into account during the correlation.

Further, the position of the masked modulation bits can be randomly chosen in order to be the least coherent possible with the structure of the spreading sequences defined by the standard. This avoids in particular to confuse two complementary codes which are only different in their odd modulation bits. Indeed, a sub-sampling rate of only 50% could fully break off the orthogonality of these spreading sequences two by two if the odd modulation bits were masked. This random selection of the modulation bits to be masked further allows to be more generic than a selection by truncation, the latter actually being functional only in the case of the standard IEEE-2011 802.15.4™-2011.

The method according to the invention further comprises, subsequent to the correlating step, the steps of searching for the correlation maximum to identify which of the plurality of spread code sequences modulates the modulated data symbol received, and decoding the modulated data symbol received from the identified spread code sequence.

In the invention, the operating margin Mf' is dynamically adjusted in order to minimize calculations and thus consumption while ensuring the same performances in terms of error rates. For this, the method comprises, at the end of the correlating step, the step of calculating the deviation between the two greatest correlation values, and of modifying or not, depending on said deviation or on a value calculated from said deviation, the number of modulation bits masked during the sub-sampling step which will be applied to the next modulated symbol received in the data stream received by the receiver.

The deviation between the two greatest correlation values provides the operating margin Mf'. The interest of this measurement is multiple because it allows to be sensitive to different parameters that can influence the difference between both maxima. Indeed, this measurement encompasses the noise level, the quality of the time synchronization, the quality of the frequency synchronization, the orthogonality between the sequences and the strength of the signal received (equivalent to the sample amplitude).

The modification in the number of the masked modulation bits can be based on the instantaneous value of the operating margin Mf' or even on an average of the operating margin corresponding to the demodulation of several modulated symbols successively received. The modification decision can be based on a preset configurations table or even can be based on an algorithmic process.

The modification in the number of masked modulation bits during the sub-sampling step can be an increase in the number of masked bits when said deviation or value calculated from said deviation is higher than a threshold and a reduction in the number of masked bits when said deviation or the value calculated from said deviation is lower than a threshold. In particular, depending on the margin measured, a decision is made for degrading the demodulation performance, that is for increasing the number of masked bits, up to a nominal operating limit, that is an imposed error rate.

Figure 3:
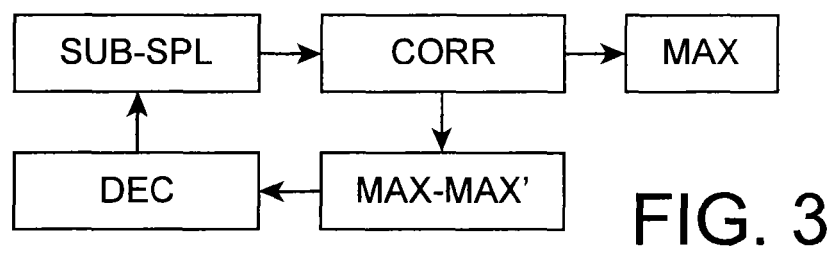
FIG. 3 is a flowchart illustrating the different steps of a decoding method according to a possible embodiment of the invention.

FIG. 3 schematically illustrates the different steps of the method according to the invention in its embodiment with a reconfiguration loop using the measurement of the operating margin Mf'. Thus, there is once again the correlating step "CORR" and the step of searching for the correlation maximum "MAX" enabling the received modulated symbol to be decoded. The result of the correlating step "CORR" is also used during the step of calculating "MAX-MAX" the deviation between the two greatest correlation values. A reconfiguration decision "DEC" is made depending on the calculation result "MAX-MAX", and gives the order to make the sub-sampling step "SUB-SPL" of a received modulated symbol before the correlation "CORR".

Figure 4:
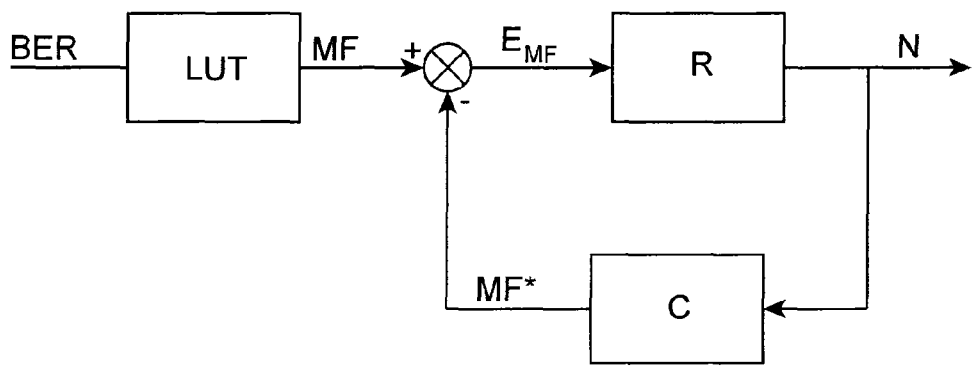
FIG. 4 is a diagram of a feedback loop that can be implemented to maintain a bit error rate target by automatically adapting the number of modulation bits to be masked.

The decision to modify may be implemented so as to ensure a target bit error rate. Referring to FIG. 4, a closed loop control may be implemented that allows to automatically adapt the number N of modulation bits to be masked in order to meet the target bit error rate BER. The target error rate BER is converted into a target operating margin MF, for example by means of a look-up table LUT. A measure of the actual operating margin MF* is subtracted from the target operating margin MF by a subtracter which outputs an operating margin error EMF. This error EMF is inputted to a regulator R configured for outputting the number N of modulation bits to be masked. The regulator is for example of the integral type. Masking N modulation results in the actual operating margin*MF, whose measurement is obtained through the correlator C whose expression can take the form of a simple gain.

Figure 5:
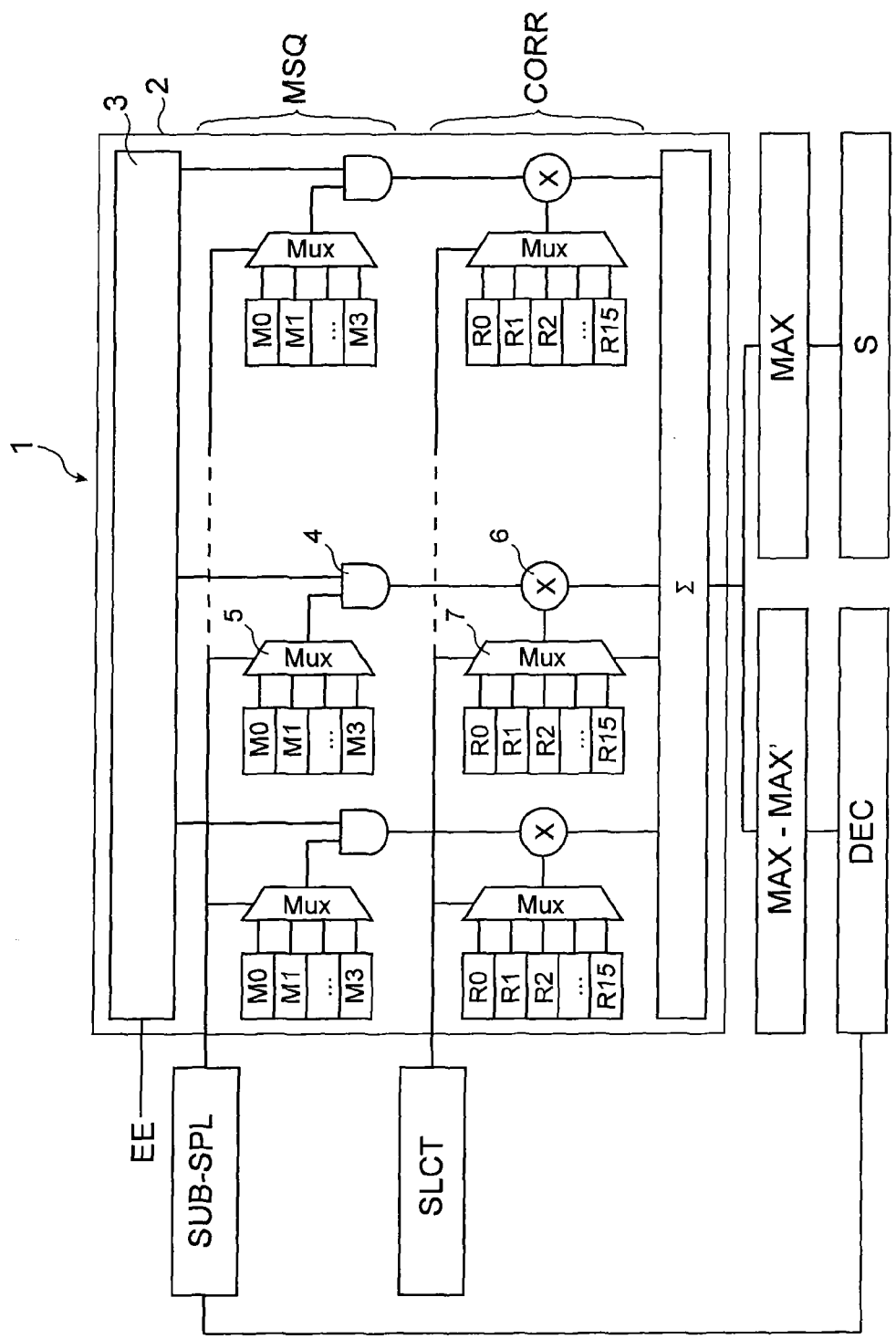
FIGS. 5 and 6 are schemes of demodulation units according to two possible embodiments of the invention.
Figure 6:
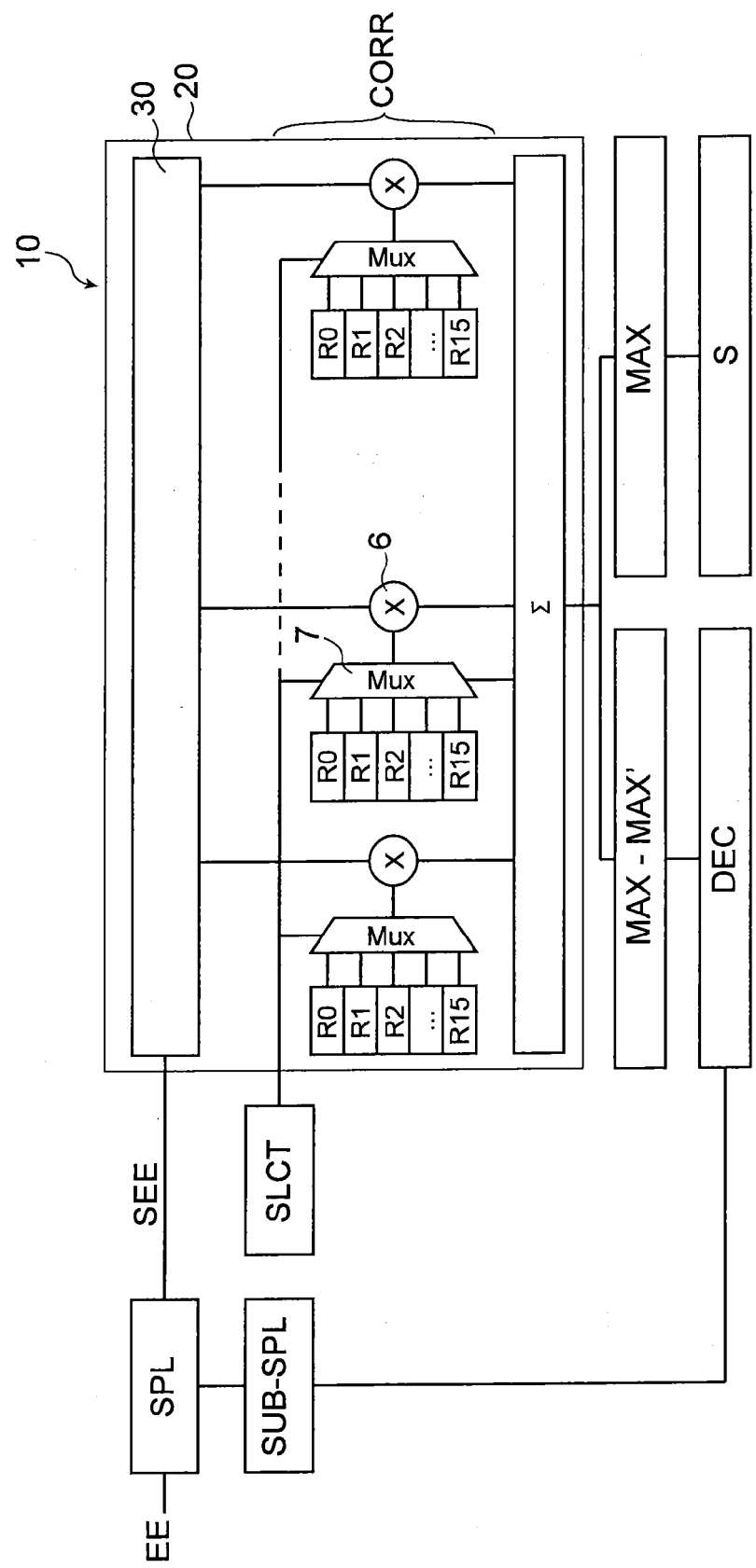

In FIGS. 5 and 6 represented are two exemplary embodiments of a demodulation unit intended to be integrated to a radio signal receiver and configured to implement the previously described method. In these figures, the different modules of this unit bear the same references of the different steps of FIG. 3 they implement.

The demodulation unit 1 of FIG. 5 exploits a fixed-size code correlator 2, and a sub-sampling of modulation bits of a received modulated symbol integrated to the code correlator 2. The code correlator 2 receives the samples from the radio signal EE and stores in a fixed-size register 3 the 32 samples of the radio signal corresponding to the 32 modulation bits of a received modulated symbol. The code correlator 2 has 32 processing channels in parallel, each channel comprising a stage of masking MSQ a modulation bit followed by a correlating stage CORR with a corresponding bit of each of the spread code sequences.

The masking stage MSQ includes an AND logic gate 4 having two inputs: a first input connected to a memory block of the register 3 and on which a modulation bit of the received modulated symbol is found, and a second input connected to the output of a so-called masking multiplexer 5, and on which a logical level 0 or 1 is found depending on whether the modulation bit has to be masked or not. The masking multiplexer 5 has several inputs M0-M3 corresponding to different sub-sampling masks describing which modulation bits are to be masked and thus to be removed from the correlation. Thus, the second input of the AND gate 4 is connected, via the multiplexer 5, to memory blocks of registers storing the sub-sampling masks. The multiplexer 5 is controlled by a module for selecting the sub-sampling SUB-SPL indicating which of the masks is to be used. The output of the AND gate 4 is connected to the correlating stage CORR. A constant logical level 0 on this output inhibits the correlation of the corresponding modulation bit.

The masking stage MSQ thus forms with the module for selecting the sub-sampling SUB-SPL a sub-sampling stage upstream of the correlating stage CORR, the fixed-size register 3 being arranged upstream of this sub-sampling stage.

The correlating stage CORR comprises a multiplier 6 having as its inputs on the one hand the output of the AND gate 4 and on the other hand the output of a so-called correlation multiplexer 7 having as its inputs a modulation bit of each of the spread code sequences R0-R15. The correlation multiplexer 7 is controlled by a SLCT module configured to scan successively, and in parallel on the different channels, the 16 sequences M0-M16.

Thus, during the step of correlating the sub-sampled data symbol received, the correlation with one of the plurality of spread code sequences consists in carrying out a multiplication of one modulation bit of the sub-sampled data symbol received with a corresponding modulation bit of the spread code sequence only for the non-masked modulation bits. Only the multipliers associated with the non-masked bits are thus used, which decreases the number of calculations (reduction corresponding to the number of masked bits times the number of spread code sequences) and thus the consumption.

The output of each of the 32 multipliers 8 is provided to an adder 1. The output of the adder is delivered to a module MAX in charge of searching for the correlation maximum from the 16 sequences scanned. When the signal is complex, as is the case with the O-QPSK modulation recommended by IEEE 802.15.4 standard, the square of the modulus is taken into consideration for this search. Once this maximum is identified, a module S performs the decoding of the received modulated symbol. The output of the adder is also provided to a module MAX-MAX' in charge of calculating the operating margin. The operating margin thus calculated feeds a module DEC in charge of making a possible reconfiguration decision, which decision is then transmitted to the module for selecting the sub-sampling SUB-SPL.

The different sub-sampling masks M0-M3 have preferably different sampling rates, for example 100%, 75%, 50% and 25%, which enables the demodulation unit to be reconfigured according to different possible operating points. Upon defining these masks, the modulation bits having to be masked are preferably randomly chosen as set forth previously.

The demodulation unit 10 of FIG. 6 in turn exploits a variable-size code correlator 20, and a sub-sampling of the modulation bits of a modulated symbol made outside the code correlator by a sampler SPL. The sampler SPL receives the samples of the radio signal EE and sub-samples them under the control of a module for selecting the sub-sampling SUB-SPL in accordance with that of FIG. 5. The sampler SPL can be specific to the demodulation unit 10. It can also be placed at the analog-to-digital conversion of the receiving channel of the receiver. The sampler SPL and the module for selecting the sub-sampling SUB-SPL form the sub-sampling stage, herein non-integrated to the code correlator.

In this implementation, the masked modulation bits are removed on the fly as soon as the sampling is made. The selected sub-sampling mask is gradually read at the same time as the samples of the radio signal EE for determining whether the modulation bits of the received modulated symbol have to be sampled or not. The spread code sequences R0-R15 are on the other hand sub-sampled in the same way.

The non-masked modulation bits SEE are provided to the variable-size code correlator 20 which stores them in a variable-size register 30. The code correlator 20 only includes herein one correlating stage CORR having a variable number of channels in parallel and performing the correlation of the sub-sampled modulation bits with each of the 16 sub-sampled spread code sequences. In this embodiment, the variable-size register is interposed between the sub-sampling stage SUB-SPL, SPL and the correlating stage CORR.

The other elements of the demodulation unit of FIG. 6 are identical to those of FIG. 5 and are not further described.

Figure 7:
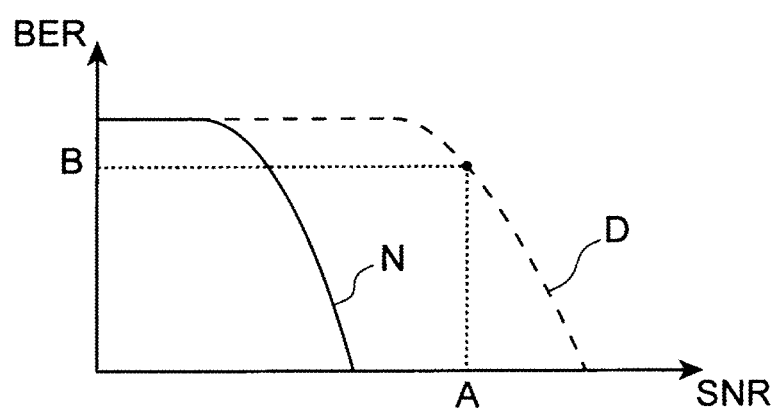
FIG. 7 illustrates the principle of the invention of adapting the performance/consumption operating point to the actual conditions.

In FIG. 7, represented is the bit error rate BER as a function of the signal-to-noise ratio SNR for the case of a non-degraded operation (curve N) and in the case of a degraded operation in accordance with the invention (curve D). It is readily understood that to meet an error rate B when the signal to noise ratio is equal to A, it is preferable, at a constant performance, to favor the degraded operation which is accompanied by a decrease in consumption rather than the non-degraded operation. The invention is thus advantageously applicable in wireless sensor networks, and more generally in the Internet of objects where the issue of consumption seems essential.

The invention is not restricted to the method as previously described, but also extends to a demodulation unit configured to implement this method, and in particular to a demodulation unit of a data symbol received by a receiver of a communication system, the data symbol being modulated by a spread code sequence selected from a plurality of spread code sequences quasi-orthogonal to each other to differentiate the symbol from other data symbols, and received in the form of a set of modulation bits, the unit comprising a stage of correlating the modulated data symbol received with each of the plurality of the spread code sequence, and being characterized in that it includes, upstream of the correlating stage, a stage of sub-sampling the modulated data symbol received which is configured to mask one or more of the modulation bits, such that the correlation of the sub-sampled data symbol received is only made for the non-masked modulation bits.

The demodulation unit can comprise a fixed-size register upstream of the sub-sampling stage for recording modulation bits of the received modulated symbol. Alternatively, it can comprise a variable-size register interposed between the sub-sampling stage and the correlating stage for recording the non-masked modulation bits of the modulated symbol received.

The invention also extends to a receiver for a communication system comprising such a demodulation unit.

The invention claimed is:

1. A method of decoding a data symbol carried by a radio signal received by a radio receiver of a communication system, the data symbol being modulated by a spread code sequence selected from a plurality of spread code sequences being quasi-orthogonal to each other to differentiate the data symbol from other data symbols, and the modulated data symbol being received as a set of modulation bits, the method comprising:
   performing a first sub-sampling of the received modulated data symbol corresponding to the data symbol carried by the received radio signal to mask one or more of the modulation bits therein;
   after the first sub-sampling, correlating the received modulated data symbol with each of the plurality of spread code sequences, the correlating being carried out only for the non-masked modulation bits;
   calculating the deviation between two greatest correlation values obtained at the end of the correlating; and
   setting, depending on said calculated deviation, a number of modulation bits masked during a second sub-sampling of a next received modulated data symbol.

2. The method according to claim 1, further comprising, subsequent to the correlating:
    searching for the correlation maximum to identify which one of the plurality of spread code sequences is the one which modulates the received modulated data symbol; and
    decoding the received modulated data symbol from the identified spread code sequence.

3. The method according to claim 1, wherein setting the number of masked modulation bits during the second sub-sampling includes increasing the number of masked bits when said calculated deviation or a value derived from said calculated deviation is higher than a first threshold and reducing the number of masked bits when said calculated deviation or value derived from said calculated deviation is lower than a second threshold.

4. The method according to claim 1, wherein setting the number of masked bits during the second sub-sampling comprises selecting a sub-sampling mask from a plurality of sub-sampling masks.

5. The method according to claim 1, wherein during the correlating, correlating with one of the plurality of spread code sequences consists in carrying out a multiplication of a modulation bit of the sub-sampled received modulated data symbol with a corresponding modulation bit of the spread code sequence only for the non-masked modulation bits.

6. The method according to claim 1, wherein setting the number of modulation bits masked during the second sub-sampling is performed by a closed loop control process to meet a target bit error rate.

7. The method according to claim 1, wherein the modulation bits of the received modulated data symbol are recorded in a fixed-size register before the first sub-sampling.

8. The method according to claim 1, wherein the non-masked modulation bits of the received modulated data symbol are recorded in a variable-size register after the first sub-sampling.

9. A communication system comprising:
    a radio receiver configured to receive a radio signal that carries a data symbol; and
    circuitry configured to
        demodulate the data symbol received by the radio receiver, the data symbol being modulated by a spread code sequence selected from a plurality of spread code sequences being quasi-orthogonal to each other to differentiate the symbol from other data symbols, and the modulated data symbol being received as a set of modulation bits;
        perform a first sub-sampling of the received modulated data symbol corresponding to the data symbol carried by the received radio signal to mask one or more of the modulation bits therein;
        after the first sub-sampling, correlate the received modulated data symbol with each of the plurality of spread code sequences, the correlating being carried out only for the non-masked modulation bits;
        calculate the deviation between two greatest correlation values obtained at the end of the correlating; and
        set, depending on said calculated deviation, a number of modulation bits masked during a second sub-sampling of a next received modulated data symbol.

10. The communication system according to claim 9, further comprising a fixed-size register for recording the modulation bits of the received modulated data symbol prior to the first sub-sampling.

11. The communication system according to claim 9, further comprising a variable-size register for recording the non-masked modulation bits of the received modulated data symbol.

* * * * *